United States Patent [19]

Floyd

[11] Patent Number: 4,534,025
[45] Date of Patent: Aug. 6, 1985

[54] VEHICLE MULTIPLEX SYSTEM HAVING PROTOCOL/FORMAT FOR SECURE COMMUNICATION TRANSACTIONS

[75] Inventor: William M. Floyd, Livonia, Mich.

[73] Assignee: United Technologies Automotive, Inc., Dearborn, Mich.

[21] Appl. No.: 469,591

[22] Filed: Feb. 24, 1983

[51] Int. Cl.$^3$ .......................... H04J 3/02; H04J 3/00; H04J 6/00

[52] U.S. Cl. .......................................... 370/85; 370/94

[58] Field of Search ........................ 370/85, 86, 94 U; 340/870.13, 825.54

[56] References Cited

U.S. PATENT DOCUMENTS

| | | | |
|---|---|---|---|
| 3,924,240 | 12/1975 | Given | 370/85 |
| 4,139,737 | 2/1979 | Shimada et al. | 370/85 |
| 4,270,205 | 5/1981 | DeShon | 370/94 U |
| 4,290,134 | 9/1981 | Hampshire | 370/85 |
| 4,293,947 | 10/1981 | Brittain | 370/85 |
| 4,355,385 | 10/1982 | Hampshire et al. | 370/85 |
| 4,410,983 | 10/1983 | Cope | 370/85 |

*Primary Examiner*—Douglas W. Olms
*Assistant Examiner*—Wellington Chin
*Attorney, Agent, or Firm*—Stephen A. Schneeberger

[57] ABSTRACT

An improved serial data protocol/format is provided in a serial multiplex system for use in an automotive vehicle electrical system which is subject to electrical noise. The protocol/format includes successive transactions between a master controller and respective remote controllers each connected to a serial multiplex bus. Each transaction is bidirectional and includes a command message transmitted by the master controller and a reply message normally transmitted by an answering remote controller. Each command message is preceded by a multibit SYNC byte. The command message includes an address byte (for a particular remote controller), a command byte, and an error check such as a cyclic redundancy check byte passed on the address and command bytes. The reply message includes the address byte of the replying remote controller, a response byte indicative of its response to the command byte, and an error check such as a cyclic redundancy check byte based on the reply address and response bytes. The master controller may be caused to repeat the transmission of a command message if the address bytes, the command/response correlations or error check bytes are not verifiable, thereby enhancing the system's ability to detect and/or reject errors as might be occasioned by noise.

14 Claims, 6 Drawing Figures

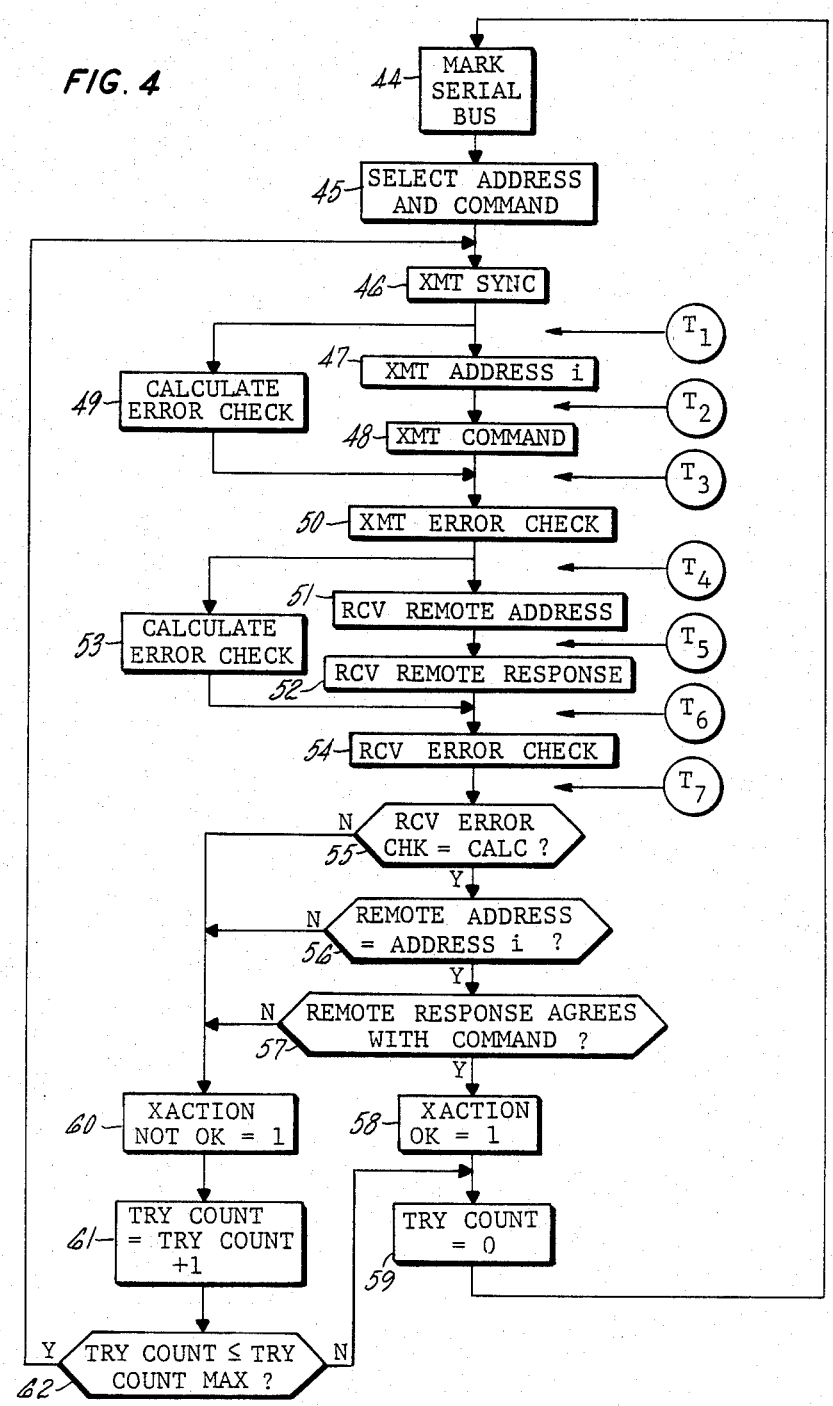

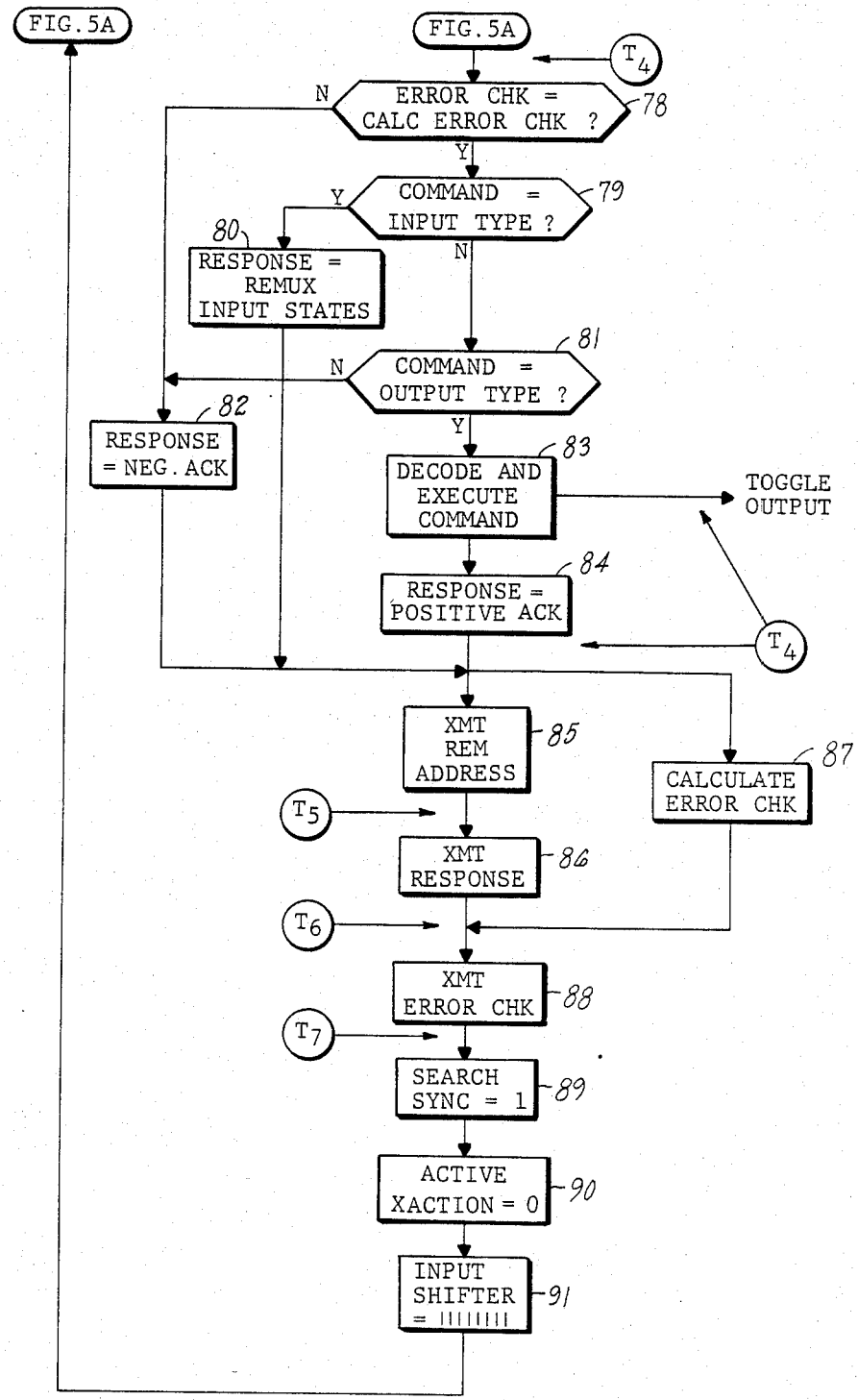

VEHICLE MULTIPLEX SYSTEM HAVING PROTOCOL/FORMAT FOR SECURE COMMUNICATION TRANSACTIONS

DESCRIPTION

1. Technical Field

The invention relates to an automotive vehicle electrical system and more particularly to a multiplex system for use in an automotive vehicle electrical system. More particularly still, the invention relates to a serial protocol/format for a multiplex system.

2. Background Art

The use of serial time-multiplexed communications of control signals has been known in various vehicular systems, one recent example appearing in U.S. Pat. No. 4,365,694 to Bittar for Preventing Elevator Car Calls Behind Car.

Various systems have been disclosed for transmitting control data in a serial multiplex fashion between one or more transmitters and one or more receivers in automotive vehicle electrical systems, one relatively early example being illustrated in U.S. Pat. No. 3,742,447 to Sognefest et al.

Continued development of multiplex systems has placed emphasis on factors such as improved reliability and performance. Specifically, the automotive vehicle environment is a very difficult one in which to operate the complex electronic circuits which comprise the current multiplex systems. In that regard, effort has been devoted to reducing the effects of electrical noise, such as electromagnetic interference.

In U.S. Pat. No. 4,276,640 to McNamee et al, there is disclosed a noise tolerant multiplex system having a transmitter and a receiver, and in which the transmitter includes a tri-state driver for generating a three-level serial data output signal indicative of the status of input switches. The data is generated at a high rate to eliminate any deleterious effects of noise on the system. Specifically, when an input switch is closed, the resulting serial data is transmitted to the receiver at a rate of 10,000 times per second, and the transmission continues as long as the input switch remains closed. Because of this high update rate, occasional incorrect data resulting from noise transients is replaced by correct control data, and the slow-responding loads, such as motors, respond in a correct manner.

Another system is disclosed in U.S. Pat. No. 4,302,841 to McCulloch in which a microprocessor based transmitter utilizes a serial data line for transmitting data to a plurality of load-controlling receivers connected therealong. The transmitter responds to the states of a plurality of control switches to produce a sequence of digital messages, or words, each containing an address byte, or code, and a command byte, or code. Each receiver includes address code recognition means, and operates to control the associated loads in accordance with the command code included in the same word as its address code. Moreover, the transmitter is such that each word of the digital sequence contains in addition to the address code and the command code, a repetition of one code and the inverse of the other code. Each receiver is capable of checking that each code is consistent with its repetition or inverse. Each receiver is also capable of sending a reply code to the transmitter signifying that the loads controlled by that receiver are appropriately energized. Specifically, each word produced by the transmitter contains, in order, the address code, a repetition of the address code, the command code and the inverse of the command code. The receiver may refuse to receive the command code and its inverse unless it has received the appropriate address code twice. This system achieves a level of noise immunity since each receiver only receives command data when the address data has already been checked.

The multiplex system of the aforementioned U.S. Pat. No 4,276,640 is intended for use in a single-receiver system and places reliance upon the relatively slow response rates of the loads and a relatively rapid, repeated data rate to minimixe the effects of noise. Such constraints may be unacceptable in a system requiring several receivers and/or a slower data rate. Moreover, it is unclear how the system responds when two or more input switches are closed concurrently.

The system of the aforementioned U.S. Pat. No. 4,302,841 provides for transmitting data to each of several receivers, and it formats the data in such a way that circuitry associated with the receiver may, under certain circumstances, determine that an incorrect signal has been received and close down the receiver. However, that system possesses certain characteristics which might be viewed as limitations in certain circumstances. For instance, without a reply address the transmitter does not know which receiver is responding; there is no provision for receiving switch inputs at the receivers; two-bit errors might go unnoticed; and the overhead for error checking is one hundred percent, with an error byte for each message byte.

It is a principal object of the present invention to provide an improved serial multiplex system for use in an automotive vehicle electrical system. Included within this object is the provision of a multiplex system having improved security against interference from electrical noise.

It is a further object of the invention to provide an improved multiplex system having stringent error detection/rejection capabilities included in the serial communications protocol/format. Included in this object is a protocol/format suitable for addressing a plurality of remote controllers from a master controller.

In accordance with the present invention, there is provided for use in an automotive vehicle electrical system, a serial multiplex system having a master controller, a plurality of remote controllers and an improved serial data protocol/format between the controllers for improving the system's security against interference from electrical noise. Stringent error detection and rejection capabilities are provided in the communications protocol/format. As used herein, "protocol" refers to the line discipline or set of rules that are followed by interconnected devices on the bus in order to insure the orderly transfer of information, and "format" refers to the number of bits per transmission on the bus.

More particularly, the master controllers and remote controllers are structured to interact with a protocol/format which comprises successive transactions between the master controller and respective ones of the remote controllers. Each transaction is bidirectional and comprises a multibyte command message from the master controller to a particular remote controller, and a multibyte reply message in the reverse direction. The command message includes a particular address byte for a particular intended remote controller, and a command byte. The reply message includes the particular address byte of the particular answering remote controller, and a response byte indicative of a response to the command received by answering remote controller. The response may indicate the response of an output device to a command or it may reveal an input from an input device. The master controller includes the capability of verifying that the address byte received in the reply corresponds with that transmitted in the command message, and that the response byte received in the reply is indicative of the anticipated response to the command byte transmitted in the command message. Absent such verification, the master controller will at least once repeat transmission of the command message.

Further, the master controller and each of the remote controllers has the dual capability of calculating an error check byte for transmission and of calculating an error check byte for comparison with a received error check byte. Thus, each transaction includes an error check byte transmitted as part of the command message and an error check byte transmitted as part of the reply message. Failure of an error check match at the remote controller is reflected in the response byte of the reply message, and failure of an error check match at the master controller is determined there, either one of which events will result in the master controller at least once repeating the command message. A preferred error check is a cyclical redundancy check based on the address and command bytes in the command message, and based on the address and reply bytes in the reply message.

A multibit sync byte is transmitted by the master controller to initiate each transaction and terminate a possible interval of latency. The sync byte and each byte of the transaction are eight bits in the illustrated embodiment.

BRIEF DESCRIPTION OF THE DRAWINGS

FIG. 4 is a simplified, logic flow diagram of the master multiplex controller in accordance with the protocol/format of the invention; and FIGS. 5A and 5B in combination comprise a simplified, logic flow diagram of a representative remote multiplex controller in accordance with the protocol/format of the invention.

BEST MODE FOR CARRYING OUT THE INVENTION

Figure 1:
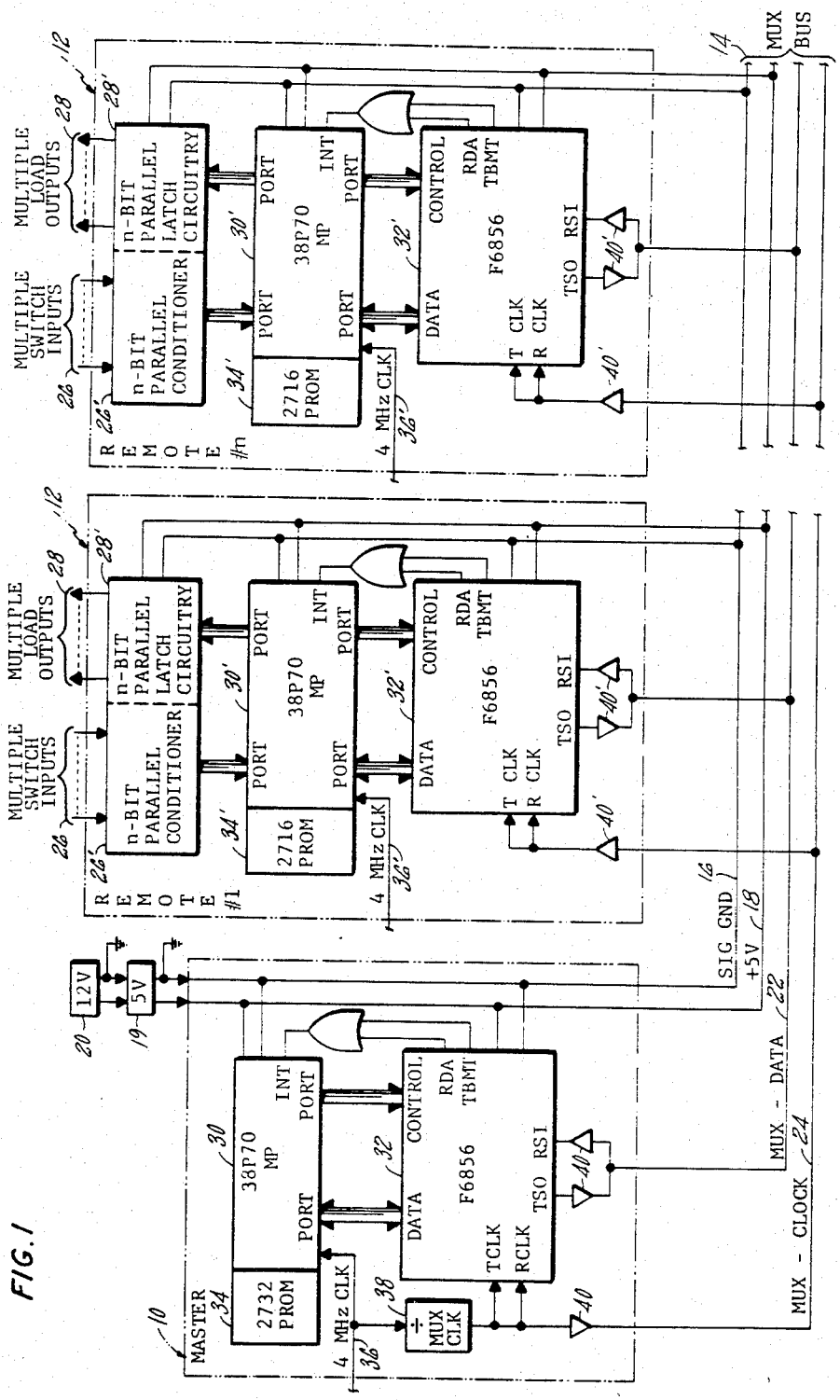
FIG. 1 is a block diagram of a vehicle multiplex system in accordance with the invention.

Referring initially to FIG. 1, there is illustrated an automotive multiplexer emulator system capable of implementing the serial data protocol/format of the invention. The multiplexer system includes a master controller 10 operatively connected to a plurality of remote controllers 12 individually numbered #1 through #n. The remote controllers 12 are each connected to a four-wire multiplex bus extending from the master controller 10. One conductor in bus 14, wire 16, provides a signal ground to which the master controller 10 and each of the remote controllers 12 are connected. Another conductor in bus 14, wire 18, conveys a +5 V DC voltage level to the master controller 10 and each of the remote controllers 12 for powering the electronic circuitry of those controllers. The 5 V DC supply is obtained from a 5 V regulator 19 in turn connected to the 12 V DC power system 20 of an automotive vehicle. A further conductor in bus 14, wire 22, conveys serial data between the master controller 10 and the several remote controllers 12 in accordance with the protocol/format of the present invention. A fourth conductor in bus 14, wire 24, conveys the multiplex clock signal from the master controller 10 to each of the remote controllers 12.

Typically, each of the remote controllers 12 is utilized to receive one or more inputs from various respective vehicle switches and/or sensors, and/or to provide one or more outputs to various respective vehicle loads, thereby to serve the "body electrical" functions of the vehicle. In the embodiment illustrated in FIG. 1, a controller 12 may receive plural (i.e., 4–8) input signals, generally designated 26, and provide plural (i.e., 4–8) output signals, generally designated 28. The inputs may typically come from a variety of manually actuated switches (not shown) for signalling a desired response from a controlled load device such as one or more particular lights, the horn, trunk release, power windows, etc. Load condition sensors (not shown) might also provide inputs which reveal the status of a particular load. The outputs typically effect one or the other of the states of a two-state load device (i.e., on-off, up-down, open-close), however it will be appreciated that control of a load device to more than two states might also be accomplished at the expense of additional data bits. Similarly, it will be appreciated that certain input devices such as sensors may provide an analog signal. Accordingly, it is necessary either internally or externally of the remote controllers 12 to provide for converting certain input signals from analog to digital and certain output signals from digital to analog. In those instances, plural digital data bits may be required to convey the respective input or output information within the multiplex system.

In addition to the possible need for A to D conversion, there may also be provision for switch debouncing in the instance of the various input switches and output latching in the event of the various output signals to the output loads. As with the A to D conversion, the switch debouncing and the output latching may either be incorporated as a portion of the respective controllers 12 or provided externally thereto, the former being preferred.

As illustrated in the embodiment of FIG. 1, the master controller 10 includes a Mostek 38P70 microprocessor controller 30. The 38P70 is an eight bit microprocessor in a controller application, providing 32 bidirection I/O lines configured as four-8 bit ports. One of these ports is used for data transfers with the F-6856 Synchronous Protocol Communications Controller 32. The communications controller 32 can provide serial data rates of up to one megabits per second and supports the protocol/format of the present invention. The communications controller 32 provides half duplex operation in the embodiment of FIG. 1. A Mostek 2732 PROM 34 piggy-backed into the microprocessor controller 30 provides 4K bytes of memory which is sufficient for the program requirements of the master controller 10. A four MHz clock 36 is supplied to the microprocessor 30 for timing its operation. Moreover, the 4 MHz clock 36 is supplied to a MUX CLK divider 38 to provide the MUX CLK on line 24. The MUX CLK is preferably at a frequency at or above the upper end of the audio range but not so high as to create radio interference. A MUX CLK frequency in the range of 15-25 KHz is generally satisfactory.

The microprocessor 30 controls the operation of the communications controller 32 in accordance with a program stored in PROM 34, the portion of that control relevant to the present invention being described later herein with reference to FIGS. 3 and 4. Because the multiplexing system of the present invention is operated in the half duplex mode, there is bidirectional data flow on data line 22. Thus, communication controller 32 includes both a Transmit Signal Output, TSO, and a Receive Signal Input, RSI, connected to the MUX data line 22 via INTEL 8216 transceivers 40. A similar transceiver 40 is connected to the output of the MUX CLK source 38 for the one-way transmission of the MUX CLK on line 24 to the various remote controllers 12.

Referring to the remote controllers 12 as depicted in the FIG. 1 embodiment of the multiplex system operated in accordance with the invention, it will be seen that those controllers also employ respective 38P70 microprocessors 30' as well as F-6856 communications controllers 32' and 8216 transceivers 40'. Each of the remote controllers 12 requires less stored program instruction than does the master controller 10 thus the 2716 PROMs 34' associated with the microprocessors 30' of the remote controllers 12 need only have a 2K byte capacity. The 4 MHz clock 36 for the microprocessors 30' may be developed locally at the respective remote controllers 12 and need not be in synchronization with one another nor with the 4 MHz clock 36 of the master controller 10.

Each of the remote controllers 12 illustrated in FIG. 1 additionally includes an n-bit parallel conditioner circuit 26' to prepare the system's input signals to proper form (digital logic levels) to be read onto the serial data stream. Also, each remote controller 12 provides an n-bit parallel latch circuit 28' to prepare the system's output signals (digital logic levels) to the voltage and current levels required by vehicle loads (lamps, motors, etc.). Each of the microprocessors 30 and 30' in the master and remote controllers 10 and 12 respectively has one 8 bit port used for data transfer with the respective communications controller 32 or 32' and a second 8 bit port used to interface with the control lines of the respective communications controller 32 or 32'. Moreover, the microprocessors 30' of the remote controllers 12 use the two remaining 8 bit ports to interface with the n-bit parallel circuitry which in turn provide signals to loads or receive signals from switches or sensors externally of the respective controllers. The actual controlling program for the communications controllers 32 and 32' requires less than 512 bytes of PROM memory. The control program is interrupt driven and vector called whenever the Receiver Data Available (RDA) or Transmit Buffer Empty (TBM) signal lines of communications controllers 32 or 32' go active.

Figures 2, 3:
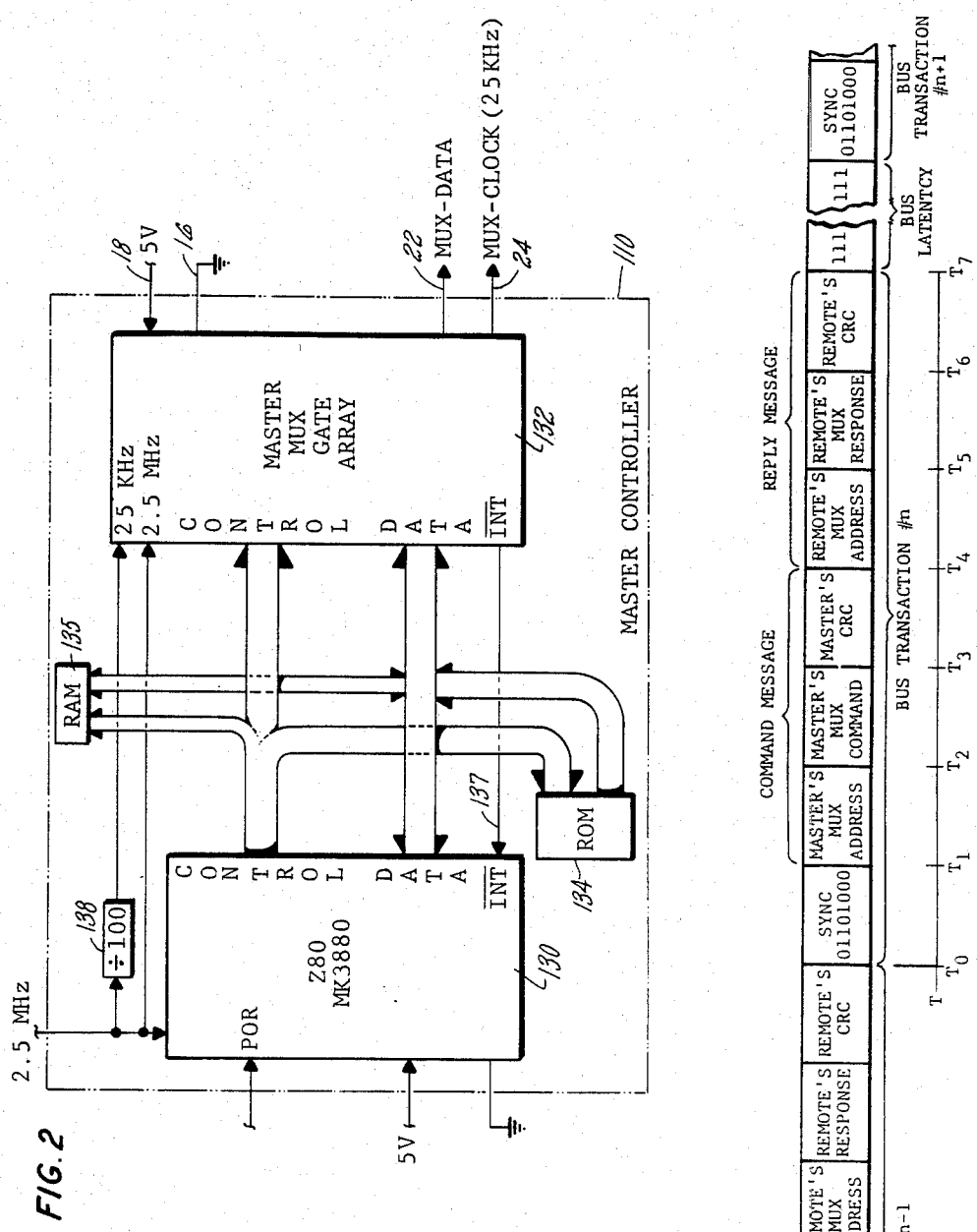
FIG. 2 is a block diagram of a modified form of the master controller of the multiplex system.
FIG. 3. is a graphical illustration of the serial data protocol/format of the invention, including a time scale.

Referring to FIG. 2, there is illustrated a master controller 110 for the multiplexing system, which controller is constituted somewhat differently from that of the FIG. 1 embodiment but which operates in generally the same manner as regards the serial protocol/format of the present invention. More specifically, the master controller 110 comprises a Zilog Z80 microprocessor 130, Read Only Memory (ROM) 134, Random Access Memory (RAM) 135, and a master multiplexer gate array 132. A master clock 36 is obtained from a source such as a crystal, not shown, which may form part of the master controller 110. The master clock 36 may have a frequency of about 2.5 MHz and is extended to the microprocessor 130 and the master multiplex 132 such that they may operate at that rate. A $\div 100$ MUX CLK divider 138 provides a 25 KHz MUX CLK signal extended to master multiplexer 132, and thence outputted therefrom and from master controller 110 on line 24. Similarly, the program stored in ROM 124 determines the operation of the microprocessor controller 130 and thus the serial protocol/format of the invention. The master multiplexer gate array 132 is in many respects analogous to the communications controller 32 of FIG. 1; however it interacts with the microprocessor 130 at the 2.5 MHz master clock frequency and its logic design is customized to support the serial protocol/format of this invention.

The master multiplexer 132 provides an interrupt (INT) on line 137 to the interrupt port INT on microprocessor 130 in order that the microprocessor may respond to communication-initiated interrupts resulting from serial bus communication transactions. The microprocessor 130 employs an executive program from ROM 134 which responds to real time interrupts to perform internal program functions. Various routines are called in timed fashion and/or in response to communication-initiated interrupts in order to determine a particular command to be sent from the master controller to a remote controller having a particular address. A particular protocol/format is established and observed in transactions between the master controller and a respective remote controller in accordance with the invention, that protocol/format being the same in both the FIG. 1 and the FIG. 2 multiplexer embodiments. The master multiplexer 132 includes logic capable of providing the logic flow routine described hereinafter with reference to FIG. 4.

Although not included in the FIG. 2 illustration, the remote controllers with which master controller 110 communicates and interacts are functionally similar to remote controllers in FIG. 1; however they may take the form of single-chip integrated circuits which include logic circuits implemented in gate array technology, or other suitable large-scale integrated circuit technology capable of providing the logic flow routine described hereinafter with reference to FIGS. 5A and 5B. Thus, the remote controllers associated with the master controller 110 of FIG. 2 may not require the respective microprocessors, read only memory and separate high frequency clocks associated with controllers 12 of FIG. 1. It should be noted that the remote controllers 12 of FIG. 1, or those associated with the FIG. 2 master controller, each have a particular different address programmed or hard-wired thereinto.

Generally speaking, the protocol/format of the invention ensures that serial data communication can occur in the vehicle-installed distributed intelligence multiplex system described previously, in a manner which will permit undegraded system functionality, even in the presence of random vehicle electromagnetic interference. The protocol/format establishes a hierarchy of error check levels which complement the intelligence of the distributed serial multiplex system. Bus communication transactions that have degraded fidelity due to vehicle EMI transients, or "noise", are unable to affect the control of system inputs and outputs, thereby preserving functional integrity of the system.

Referring to FIG. 3, there is illustrated the preferred protocol/format of the invention, although alternative formats in terms of expanded address, command, and error check bytes are also possible. A tight "handshake" transaction protocol is established. Each communication transaction that occurs on the serial bus 14 consists of two distinct sections. The first part of a transaction is a "command" transmission or message, issued by the master controller 10, 110 and received by all of the remote multiplex controllers 12. The second part of a transaction is a "reply" transmission or message, transmitted by the particular remote controller 12 to which the command message was addressed. Further, the protocol provides an 8 bit synchronization byte to initiate each transaction. Use of this synchronization byte permits a period of latency between transactions to exist, which latency may be utilized by the master controller 10, 110 for various administrative functions including a determination as to which transaction it desires to initiate next. The master controller 10, 110 typically employs a polling sequence through the several remote controllers 12, which sequence can be modified dynamically during a period of latency to react to particular responses from remote controllers 12 that are assigned priority by the System Control Program.

An important aspect of the protocol/format is the provision of error checking which occurs at three levels: hardware checks, address checks, and command-/response correlation, to be discussed hereinafter in greater detail.

In the protocol/format illustrated in FIG. 3, a typical bus transaction #n is comprised of 7 bytes, each byte consisting of 8 bits. An initial Sync byte is followed in sequence by a Master's MUX Address byte, a Master's MUX Command byte, a Master's Cyclical Redundancy Check (CRC) byte, a Remote's MUX Address byte, a Remote's MUX Response byte and a Remote's CRC. The Master's MUX Address byte represents the byte generated by master controller 10, 110 bearing the specific address of a particular one of the #1 to #n remote controllers 12. The Master's MUX Command byte contains the instructions for the particular addressed remote controller 12, which instructions may request input signals from input devices connected thereto and-/or provide output control signals to the output load devices connected thereto. The Master's MUX Address byte and the Master's MUX Command byte comprise essential components of a command message, however it is further desirable to provide an error check bit or byte as a part of that message. Although a parity bit might be included to provide a level of error check capability, it is preferable that a so-called cyclical redundancy check(CRC) byte be provided to enhance the system's ability to detect multiple bit errors. Accordingly, the Master's CRC byte comprises the third byte in the command message of a bus transaction.

In each bus transaction, the Command message is immediately followed by a Reply Message which is provided by the particular remote controller 12 which responds to the address contained in the Command Message as received at the remote controllers. In the absence of noise or other errors, the responding remote controller 12 will thus be the controller whose address was initially transmitted in the command message by the master controller 10, 110. The first byte of the reply message contains the address of the responding remote controller 12. The next byte contains information indicating what response the particular remote controller took to the command received in the command message. Finally, the reply message also includes a CRC type of error check byte.

Referring to the time scale in FIG. 3, and assuming a 25 KHz MUX CLK rate, each 8 bit byte will require 0.32 milliseconds, such that $T_1$ occurs 0.32 milliseconds after $T_0$ and a full transaction, i.e., $T_0-T_7$ requires 2.24 milliseconds, thus affording nominally 400 transactions per second.

Error checking in the present system occurs on three levels: hardware checks, address checks, and command-/response correlation. The hardware checks are implemented via the cyclic redundancy methods. Each remote multiplex controller 12 and the master multiplex controller 10, 110 contain the necessary logic circuitry to calculate and check the CRC error check byte. The CRC method of error in coding is a known technique as may be ascertained from the prior literature including an article entitled Cyclic Codes for Error Detection by W. W. Peterson and D. T. Brown and published in the proceedings of the IRE in January, 1961. The CRC technique treats the message as a polynomial or order m, with m in the present instance being 15 due to the first two 8 bit bytes preceding the error byte in a message. The polynomial is multiplied by $X^n$ and then divided by a second polynomial of order n to create a transmission stream of $m+n+1$ bits. In the present instance n is 8 because the LRC polynomial $X^8+1$ is being used. The stream of $m+n+1$ bits is 24 in the present instance. The first 16 message bits, i.e., Address and Command bytes, are transmitted without any alteration; the final 8 bits, i.e., CRC byte, are the remainder from the polynomial division using modulo 2 arithmetic. As the master controller 10, 110 serially transmits the first two bytes of the command message, it is simultaneously calculating its CRC error check byte which is transmitted immediately thereafter. Concurrently, as the apparently addressed remote controller 12 receives the first two bytes of the transmitted command message, it is also calculating a CRC error check byte for those received first two bytes. The particular remote controller 12 may then compare the CRC error check byte which it has calculated internally with the Master's CRC byte as received at the remote controller. Assuming no transmission errors, the comparison of CRC error check bytes will agree. A failure of such agreement may be reflected in the response byte transmitted in the reply message of the particular remote controller 12. A particular remote controller 12 is also capable of calculating the appropriate CRC byte for its own reply message based on the first two bytes thereof, which CRC byte is transmitted as the third byte in the reply message. The master controller 10, 110 similarly has the ability to calculate a CRC byte based on the first two bytes which it receives in the transmitted reply message. Again, assuming agreement when the transmitted and internally generated CRC bytes are compared at the master controller 10, 110, the reply message is considered to be valid. In the event of disagreement, the master controller 10, 110 typically will reinitiate the particular transaction by resending the command message, typically for some limited number of repetitions.

Address checks are implemented on both the hardware and software level in the present system. Each remote controller 12 is wired via printed circuit board pattern to respond to a unique 8 bit address in the system, thereby permitting an address space of 256 possible remote controllers 12. When the master controller 10, 110 transmits its Command message, that message is being directed at a specific one of the remote controllers 12. Several possible situations can occur, the first being that the address byte is received with fidelity by the various remote controllers 12 such that the particular addressed controller responds. Alternatively, the address byte may be received with degraded fidelity by one or more of the remote controllers 12 such that the wrong controller responds. Alternatively still, the address byte may be received with degraded fidelity by the various remote controllers 12 and be such that no such controller responds. Thus, a remote controller 12 makes a straightforward decision on the addressing check: either respond or don't respond.

The master controller 10, 110 is typically capable of more sophisticated decision-making performance in the event it receives no response from any remote controller 12, it can decide to repeat the particular transaction. In the situation in which an improper remote controller 12 responds, the master controller 10, 110 may enter into an emergency software routine to correct any possible anomolous system functionality that may result. In the typical situation in which a response is received from the correct remote controller 12, the master controller 10, 110 may then enter into a higher level of error check routine, as for instance command/response correlation. The command/response error checks are performed after the aforedescribed two levels of error check are correctly passed. The Command byte can only command two or possibly three operation modes to occur in a particular remote controller 12. Principally, the command byte can effect the change of state of one or more output signals to load devices and/or it can effect reading the states of one or more input signals to the remote controller. Although not described in detail herein, the Command byte might also require an addressed remote controller 12 to send a fixed diagnostic message. All modes of operation by the remote controllers 12 regarding their respective input and/or output devices are obtained by decoding certain subcombinations of the Command byte. In the event the Command byte has been degraded during transmission and does not conform to an output or an input type command (or diagnostic, in the event such capability is included), the remote controller 12 will respond with a Negative Acknowledge response byte (FF) in hexidecimal=(11111111) in binary. This alerts the master controller 10, 110 to the fact that the particular remote controller 12 did not properly receive the transmission and is not executing the command. If an output command is sent to a particular remote controller 12, that controller will either be writing a 1 or a 0 to one of its output signals. There are two Positive Acknowledge response bytes possible for the mode; and (F0) in hexidecimal=(11110000) in binary for the "write 1" case and a (0F) in hexidecimal=(00001111) in binary for the "write 0" case. Failure of the Response byte for an output mode command to correlate will result in the master controller 10, 110 entering into an error correction mode, ensuring that the desired functional system outputs are obtained from subsequent commands.

In the event a diagnostic mode is employed in the system, the Positive Acknowledge response byte to a diagnostic mode command may be a series of alternating 1s and 0s if the remote multiplex address is even and a series of alternating 0s and 1s if the remote address is odd. Note that in each of the four aforementioned Positive Acknowledge response bytes that it requires 8 bit errors simultaneously before any of those bytes can be confused with one another.

If an input mode command is sent to a remote controller 12, the response byte indicates the state of 8 input devices applied to that controller. Switches are debounced to eliminate transient multiple edges from being reported in response bytes. Depending upon the application, at least two correlation methods can be employed for input response bytes. Specifically, for fairly rapidly changing input switches, two bits per switch can be employed so that the master controller 10, 110 and software can check for the same indication between the redundant bits of the response, i.e., a 2 bit error would be required before this situation would be unobserved. Alternatively, for slowly changing input switches the program of the master controller 10, 110 may call for multiple reading of a particular remote controller 12 such that switch debouncing is in effect obtained by time integrating the switch inputs before using the information. It would be understood that each of these input mode command correlation methods increases system overhead, with the first reducing the number of switches which can be read in a particular transaction and the second requiring an increased number of transactions to obtain the inputs from a particular number of input devices.

Figure 5A:
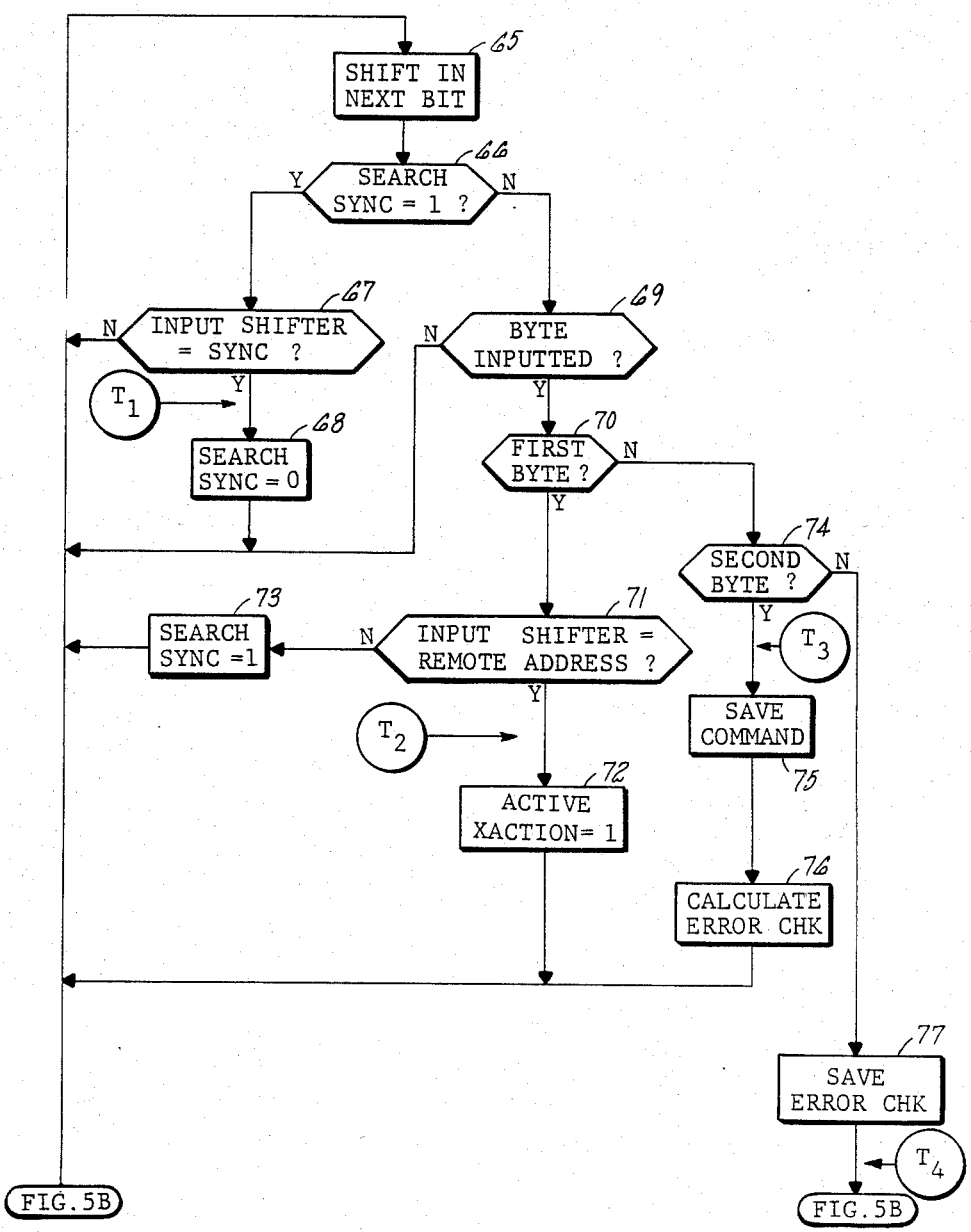

FIG. 4 is a simplified illustration of the logic flow diagram of the master multiplex controller 10, 110 in accordance with the protocol/format of the invention, and FIGS. 5A and 5B are the comparable logic flow diagram for a representative remote controller 12. Although the logic flow diagrams of FIGS. 4, 5A and 5B are essentially self-explanatory in view of the disclosure contained hereinbefore, an additional brief description of those routines may assist in a more complete understanding of the invention. Firstly, referring to the flow diagram of FIG. 4 associated with the master controller 10 or 110, the initial step 44 consists of generating and applying a continuous series of binary 1s to the MUX data line 22 to mark those periods of latency during which no transaction is occurring on the data bus. As indicated by step 45, the master controller subsequently selects a particular address of a remote controller 12 and a command to be transmitted to that remote controller. The selection of that address and command is determined by a master control program in the master controller and as a function of certain response data received from remote controllers on preceding transactions. A transaction is initiated by the generation and transmission of a sync byte, as represented by step 46. Completion of transmission of the sync byte occurs at time $T_1$. The sync byte is followed by a generation and transmission of an address byte for a remote controller having a particular address i, as represented by step 47. Immediately thereafter the command byte is generated and transmitted as represented by step 48, steps 47 and 48 being completed at times $T_2$ and $T_3$ respectively. In the interval between $T_1$ and $T_3$ the master controller 10, 110 will also be calculating an error check byte as represented by step 49. That error check byte is transmitted immediately thereafter in the interval between $T_3$ and $T_4$ as represented by step 50. At time $T_4$ one of the remote controllers 12 should be responding and accordingly the master controller 10, 110 receives a remote address byte, as represented by step 51. Subsequently, in the interval between $T_5$ and $T_6$, the master controller will also receive the response byte from the remote controller, as indicated by step 52. During the interval from $T_4$ to $T_6$, the master controller 10, 110 will be calculating an error check byte based on the received remote address and response bytes, as represented by step 53. In the interval between $T_6$ and $T_7$, the error check byte from the remote controller is received, as represented by step 54. The received error check byte is then compared with the internally calculated error check byte, as represented by step 55. If the two error checks agree, then the received remote address is compared with the address byte which had been transmitted by the master controller 10, 110 in its command message, as represented by step 56. Further assuming they agree, the response received from the remote controller is compared with that which is anticipated for the particular command which had been transmitted by the master controller in its command message, as represented by step 57. Again assuming agreement, as would be the case in an error-free transaction, a flag is set indicating the transaction was satisfactory, as represented by step 58. Correspondingly, a "try" counter is set to 0 as represented by step 59 and the routine returns to the marking latency represented by step 44 but which may be immediately replaced with a newly selected address and command as represented by step 45.

In the event any one of the three comparisons represented by the steps 55, 56 and 57 does not reflect equality, a flag is set indicating that the transaction was not O.K., as represented by step 60, whereupon a "try" counter is incremented by a count of 1, as represented by step 61. The "try" count is then compared with a maximum "try" count, as represented by step 62. A typical "try" count maximum might be two. Assuming the number of tried attempts at agreement of steps 55, 56 and 57 is less than the "try" count maximum, the routine will return to step 46 to reinitiate the same transaction. On the other hand, if the "try" count exceeds the maximum, the "try" count is reset to 0 as represented by step 59 and the system will move forward to select the next address and command.

Referring to the flow diagram of FIGS. 5A and 5B associated with the logic of each respective remote controller 12, a bit on the MUX data line 22 is shifted into an input register as by step 65. The input register is typically 8 bits in length and receives a serial input from the MUX data line 22. A Sync Search Flag is set at 1 during those intervals of bus latency in which the remote controllers awaiting a sync byte and is at 0 during those intervals from $T_1$ to $T_7$ in which a transaction is occurring, as represented by step 66. Assuming the remote controller is awaiting a sync byte, the input register or shifter will be monitored to see whether or not its 8 bit contents correspond with a sync byte, i.e., 01101000, as represented by step 67. Assuming the sync byte is not entering or has not yet fully entered the input register, it will continue to shift in bits at step 65 and continue to look for a complete Sync byte. When a full Sync byte has entered the register, as at time $T_1$, the Search Sync Flag will be set to 0, as represented by step 68. Successive bits shifted into the input register will then be tested to see if a complete 8 bit byte has been inputted, as represented by step 69. Once a full byte has been inputted, it is checked by step 70 to determine whether or not it is the first byte following the Sync byte. Assuming it is the first byte, the contents of the input register are compared with the particular address of the remote controller 12, as at step 71, and assuming agreement a flag is set in that particular remote controller, as represented by step 72, indicating an active transaction addressed to that specific remote controller. On the other hand, if the addresses do not compare, the search sync is reset to one and represented by step 73, and the particular remote controller returns to a standby state awaiting another sync byte and its specific address.

Assuming that a particular remote controller 12 has received its address in the first command message byte and has identified that it is within an active transaction, a subsequent byte from step 69 will be analyzed to determine whether or not it is a second byte in the message as represented by step 74. Assuming the answer is yes, that second byte is identified as a command byte and is saved, as represented by step 75 at time $T_3$. Immediately, the remote controller will begin calculating its error check byte, as represented by step 76. It will be understood that such an error check calculation can be made because the command byte has been saved at step 75 and each remote controller inherently knows its own address.

Assuming the incoming data is no longer the second byte, it presumably is the third byte, which represents the error check byte transmitted with the command message, and is correspondingly saved, as represented by step 77 which is completed at time $T_4$.

Referring to FIG. 5B, the error check transmitted to the remote controller and saved by step 77 at $T_4$ is compared at step 78 with the error check byte calculated internally by step 76. Assuming equality, the command byte saved at step 75 is inspected at step 79 to determine whether or not it is of an input type. Assuming the command is of the input type, the input switches or sensors to the particular remote controller provide the basis for a response byte, indicated by step 80, which is subsequently transmitted as part of the reply message. On the other hand, if the command is not of the input type, it is inspected by step 81 to determine whether or not it is of the output type. Assuming the command is not of the output type and assuming that in the embodiment under discussion there is no provision for a diagnostic response, a response byte will be formulated which comprises a negative acknowledgment, as represented by step 82. It will be noticed that in the event the error check of step 78 does not represent equality, the negative acknowledgment response of step 82 is also appropriate. Assuming the command byte is of the output type, as determined by step 81, the byte will be decoded and the command executed as represented by step 83, typically in the form of toggling an output. Correspondingly, a positive acknowledge response is formulated by step 84. All of the foregoing decisions and functions have been effected substantially at the instant designated by time $T_4$.

Subsequently, the address of the particular remote controller is transmitted, as by step 85 completed at time $T_5$, and is in turn followed by transmission of the appropriate positive or negative acknowledge response byte, as represented by step 86 completed at time $T_6$. The remote controller 12 will be calculating an error check byte as represented by step 87 which occupies the interval between $T_4$ and $T_6$. The calculated error check byte is then transmitted, as represented by step 88 completed at time $T_7$, the time $T_7$ the search sync flag is set to 1 by step 89, the active transaction flag is set to 0 by step 90, and the input shifter or register is set to all 1s as represented by step 91, to reenter a period of standby during bus latency at a waiting receipt of the next sync byte.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to be secured by Letters Patent of the United States is:

1. A time-division multiplex system for use in an automotive vehicle electrical system subject to an environment of electrical noise, said system including a master controller, one or more remote slave controllers, and serial bus means connecting said master controller with said remote controllers, each said remote controller being capable of receiving and revealing input signals from and/or being capable of providing output signals to one or more respective input and/or output devices, each said remote controller having a particular different address and being responsive to a command for providing a commanded output signal to a respective said one or more output device and/or receiving and revealing an input signal from a respective said one or more input device, said serial bus means including a data bus, said master controller and said respective remote controllers being interactively controlled by a serial data protocol/format on said data bus, said protocol/format comprising successive transactions between said master controller and respective said remote controllers, each said transaction comprising bidirectional, multibyte messages, said master controller including means for providing a multibyte command message and transmitting said message serially to said remote controller means via said data bus, said command message including a particular address byte and a command byte, each said remote controller being responsive to its respective particular address byte and to a said command byte received thereat in said command message for providing a respective said commanded output signal and/or respective said commanded input signal, said addressed remote controller including means for replying to receipt of its particular address byte by providing a multibyte reply message and for transmitting said message serially via said data bus to said master controller, said reply message including the particular address byte of the respective said remote controller means and a response byte indicative of a response to said command received by said remote controller, said master controller including means responsive to receipt of said reply message for verifying that said address byte therefrom conforms with said address byte previously transmitted from said master controller in said transaction and that said response byte therefrom is indicative of the anticipated response to said command byte previously transmitted from said master controller in said transaction and, absent said verification or anticipated response, for at least once repeating said transmission of said command message from said master controller.

2. The multiplex system of claim 1 wherein said command message provided and transmitted by said master controller is initiated by a sync byte also provided and transmitted by said master controller, for terminating a possible interval of latentcy on said data bus.

3. The multiplex system of claim 2 wherein each said sync byte is comprised of multiple digital bits to minimize single bit errors.

4. The multiplex system of claim 2 wherein each said byte in a said transaction, including said sync byte, comprises at least eight data bits.

5. The multiplex system of claim 1 wherein said master controller includes stored program means for establishing a respective address byte for each said remote controller and one or more appropriate corresponding command bytes for each said remote controller, said stored program means controlling the selection of a respective said remote controller address byte and a respective one of said command bytes for said remote controller in response to the logical functioning dictates of the electrical system.

6. The multiplex system of claim 5 wherein there are plural said remote controllers, each one of said plural remote controllers being conditioned to await a said sync byte as a condition precedent to receipt of its respective particular address byte.

7. The multiplex system of claim 1 wherein said master controller includes means for determining a first error check as a first function of certain data transmitted by said master controller in a said command message, said first error check comprising at least one data bit and being transmitted in said command message subsequent to said certain command message data, each said remote controller includes means for determining a second error check as a second function of certain data transmitted by the respective said remote controller in a said reply message, said second error check comprising at least one data bit and being transmitted in said reply message subsequent to said certain reply message data, each said remote controller further including means for determining a third error check as said first function of received data presumed to correspond with said certain data transmitted in said command message, said master controller further includes means for determining a fourth error check as said second function of received data presumed to correspond with said certain data transmitted in said reply message, said master controller and each said remote controller including respective means for comparing said fourth and said third error checks determined thereat respectively with said second and said first error checks received thereat respectively to determine equality and, absent said equality, for at least once repeating said transmission of said command message from said master controller.

8. The multiplex system of claim 7 wherein said certain data in said command message and said certain data in said reply message upon which said respective first and second error checks and third and fourth error checks are determined comprise, respectively, said address byte and said command byte in said command message, and said address byte and said response byte in said reply message.

9. The multiplex system of claim 8 wherein each said error check comprises a multiple bit cyclical redundancy check byte.

10. In a time-division multiplex system for use in an automotive vehicle electrical system subject to an environment of electrical noise, said system including a master controller, one or more remote slave controllers, and serial bus means connecting said master controller with said remote controllers, each said remote controller being capable of acquiring input signals from and/or being capable of providing output signals to one or more respective input and/or output devices, each said remote controller having a particular different address and being responsive to a command for providing a commanded output signal to a respective said one or more output device and/or receiving and revealing an input signal from a respective said one or more input device, and said serial bus means including a data bus, the method of interactively controlling said master controller and said respective remote controllers with a serial data protocol/format which enhances the system's security against interference from electrical noise, said protocol/format comprising successive bidirectional, multibyte message transactions between said master controller and respective said remote controllers on said data bus and including the steps of:

transmitting a command message from the master controller to the remote controllers, said command message including a particular address byte, a command byte and a first error check byte determined as a function of said particular address byte and said command byte;

transmitting a reply message from a particular remote controller having a particular address corresponding to that received in said command message from said master controller, said reply message including the address byte of said replying remote controller, a response byte, and a second error check byte determined as a function of said address byte of said replying remote controller and of said response byte;

error checking the command message received at said particular remote controller for equality;

error checking the reply message received at said master controller for equality, said error checking including comparing said address byte of said replying remote controller with said particular address byte previously transmitted by said master controller in said transaction; and at least once repeating the step of transmitting said command message from said master controller if said error checking fails to produce equality at either said master controller or said particular remote controller.

11. The multiplex system of claim 10 including the step of transmitting a multibit sync byte from the master controller immediately preceding each said command message.

12. The multiplex system of claim 11 wherein each said byte in said message transactions, including said sync byte, comprise at least eight data bits.

13. The multiplex system of claim 12 wherein each said error check byte is a cyclical redundancy check byte.

14. The multiplex system of claim 10 wherein said command message command byte is normally formatted to effect only a limited number of types of response actions by a remote controller, two such types of response actions being said acquisition of input signals and said provision of output signals, and including the steps of:

determining whether or not the command byte received at said particular remote controller is formatted to effect one of said limited number of types of response actions; and transmitting said determination to said master controller in said response byte of said reply message.

* * * * *